United States Patent
Vargas, II et al.

(10) Patent No.: US 9,580,095 B2
(45) Date of Patent: Feb. 28, 2017

(54) MOBILE CART

(71) Applicant: Academy, Ltd., Katy, TX (US)

(72) Inventors: Henry Vargas, II, Sugar Land, TX (US); Robert Stewart DuPriest, II, Katy, TX (US)

(73) Assignee: Academy, Ltd., Katy, TX (US)

( * ) Notice: Subject to any disclaimer, the term of this patent is extended or adjusted under 35 U.S.C. 154(b) by 0 days.

(21) Appl. No.: 14/723,071

(22) Filed: May 27, 2015

(65) Prior Publication Data

US 2016/0347338 A1    Dec. 1, 2016

(51) Int. Cl.
B62B 3/02    (2006.01)

(52) U.S. Cl.
CPC ............... B62B 3/02 (2013.01); B62B 3/022 (2013.01); B62B 3/025 (2013.01); B62B 3/027 (2013.01)

(58) Field of Classification Search
CPC .................. B62B 3/027; B62B 3/022
See application file for complete search history.

(56) References Cited

U.S. PATENT DOCUMENTS

| | | | |
|---|---|---|---|
| 1,919,103 A | 7/1933 | Dolge | |
| 2,020,766 A * | 11/1935 | Brown | B62B 3/106 220/9.3 |
| 2,575,189 A * | 11/1951 | Schmidt | A47D 9/005 280/43 |
| 4,746,140 A * | 5/1988 | Kassai | B62B 7/08 108/173 |
| 5,915,723 A * | 6/1999 | Austin | B62B 3/02 280/43 |
| 5,975,626 A | 11/1999 | Aycock | |
| 6,101,678 A | 8/2000 | Malloy et al. | |
| 6,241,311 B1 | 6/2001 | Zheng | |
| 6,354,619 B1 | 3/2002 | Kim | |
| 6,491,318 B1 * | 12/2002 | Galt | B62B 3/02 280/42 |
| 6,499,906 B1 | 12/2002 | Zheng | |
| 6,533,489 B1 | 3/2003 | Zheng | |
| 6,634,609 B2 | 10/2003 | Zheng | |
| 6,708,630 B2 | 3/2004 | Zheng | |
| 6,997,634 B2 | 2/2006 | Zheng | |
| 7,097,182 B1 * | 8/2006 | Liu | B62B 3/02 280/42 |
| 7,213,817 B2 | 5/2007 | Cheung | |

(Continued)

OTHER PUBLICATIONS http://www.hsn.com/products/hgtv-home-folding-wagon-with-water-resistant-liner/7125802?cm_mmc=cj-__-HSN+RSS+Feed-__-5232095-10699362-__-skim13934X709102X60755a36b6e3fdb66180da12e3dff8f6-NA&URL=http%3A%2F%2Fwww.hsn.com%2Fhome%2Fhgtv-home-folding-wagon-with-water-resistant-liner_p-7125802_xp.aspx%3Fcm_mmc%3Drss*Todays-Special*4*NA, Admitted Prior Art.

*Primary Examiner* — Erez Gurari
(74) *Attorney, Agent, or Firm* — Kilpatrick Townsend & Stockton LLP (57) ABSTRACT

Disclosed is a mobile cart that may include, in some instances, a framework assembly comprising an extended configuration and a collapsed configuration, at least two wheels attached to the framework assembly, and a removable liner secured to the framework assembly in a removable fashion. The removable liner may include a collapsible floor, at least three collapsible sides extending vertically from the collapsible floor, and at least one retaining member. The mobile cart may include at least three corners and the at least one retaining member may be configured such that the removable liner can be selectively removed from and secured to the framework assembly.

14 Claims, 9 Drawing Sheets

(56) References Cited

U.S. PATENT DOCUMENTS

| | | |
|---|---|---|
| 7,226,059 B1 | 6/2007 | Samuels |
| 7,398,978 B2 | 7/2008 | Cheung |
| 7,427,080 B2 | 9/2008 | Naude, Jr. et al. |
| 7,547,037 B2 | 6/2009 | Poppinga et al. |
| 8,011,686 B2 | 9/2011 | Chen et al. |
| 8,042,819 B2 | 10/2011 | Arnold et al. |
| 8,162,349 B1 * | 4/2012 | Roselle .................. B62B 1/008 280/639 |
| 8,220,824 B2 | 7/2012 | Chen et al. |
| 8,388,015 B2 | 3/2013 | Chen |
| 8,567,810 B2 | 10/2013 | Abecassis et al. |
| 8,998,246 B2 * | 4/2015 | Griffard .................. B62B 3/007 280/47.34 |
| 9,033,361 B2 * | 5/2015 | Frankel .................... B62B 3/027 280/47.34 |
| 9,085,311 B1 * | 7/2015 | Chen ....................... B62B 3/007 |
| 9,101,206 B1 * | 8/2015 | Chen ....................... B62B 3/007 |
| D748,739 S * | 2/2016 | Horowitz ................. D21/425 |
| 9,327,749 B2 * | 5/2016 | Young ...................... B62B 3/02 |
| 2003/0016991 A1 | 1/2003 | Zheng |
| 2003/0025301 A1 | 2/2003 | Banuelos, III |
| 2003/0233966 A1 | 12/2003 | Zheng |
| 2004/0081510 A1 | 4/2004 | Zheng |
| 2005/0275195 A1 | 12/2005 | Matula et al. |
| 2006/0083580 A1 | 4/2006 | Zheng |
| 2006/0119056 A1 * | 6/2006 | Olsen ....................... A47B 3/10 280/30 |
| 2007/0278768 A1 | 12/2007 | Lynam |
| 2008/0061524 A1 | 3/2008 | Goldszer |
| 2008/0135365 A1 | 6/2008 | Han |
| 2010/0090444 A1 * | 4/2010 | Chen ....................... B62B 3/007 280/651 |
| 2010/0156069 A1 * | 6/2010 | Chen ....................... B62B 3/007 280/639 |
| 2011/0204598 A1 * | 8/2011 | Stevenson ................ B62B 3/02 280/639 |
| 2012/0274052 A1 * | 11/2012 | Zhu ......................... B62B 3/027 280/651 |
| 2012/0292952 A1 | 11/2012 | Tyson, III |
| 2014/0001735 A1 | 1/2014 | Yang et al. |
| 2014/0353945 A1 * | 12/2014 | Young ...................... B62B 3/02 280/650 |
| 2016/0082997 A1 * | 3/2016 | Horowitz ................ B62B 3/025 280/651 |

* cited by examiner

MOBILE CART

FIELD

Our invention relates to collapsible mobile carts.

BACKGROUND

Many people transport equipment or other objects in a passenger vehicle but require a way to transport the equipment or other objects beyond where the passenger vehicle travels. For example, when attending a recreational event, a person may need to transport objects from a parking area to a different area of the recreational facility. A solution is to bring a wheeled cart in the passenger vehicle. Existing devices often fail to provide an efficient folding mechanism with an easily removable and replaceable cover or liner. There is a need for improved devices and methods for folding collapsible carts.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a mobile cart comprises a framework assembly comprising an extended configuration and a collapsed configuration, at least two wheels attached to the framework assembly, and a removable liner secured to the framework assembly in a removable fashion. The removable liner may include a collapsible floor, at least three collapsible sides extending vertically from the collapsible floor, and at least one retaining member. The mobile cart may include at least three corners and the at least one retaining member may be configured such that the removable liner can be selectively removed from and secured to the framework assembly

BRIEF DESCRIPTION OF THE DRAWINGS

Illustrative, but non-limiting, embodiments of the present invention are described in detail below with reference to the following drawing figures.

DETAILED DESCRIPTION

This section describes non-limiting examples of mobile carts and does not limit the scope of the claimed subject matter. The claimed subject matter may be embodied in other ways, may include different elements or other attributes, and may be used in conjunction with other existing or future technologies. This description should not be interpreted as requiring any particular order or arrangement among or between various elements.

Figure 1:
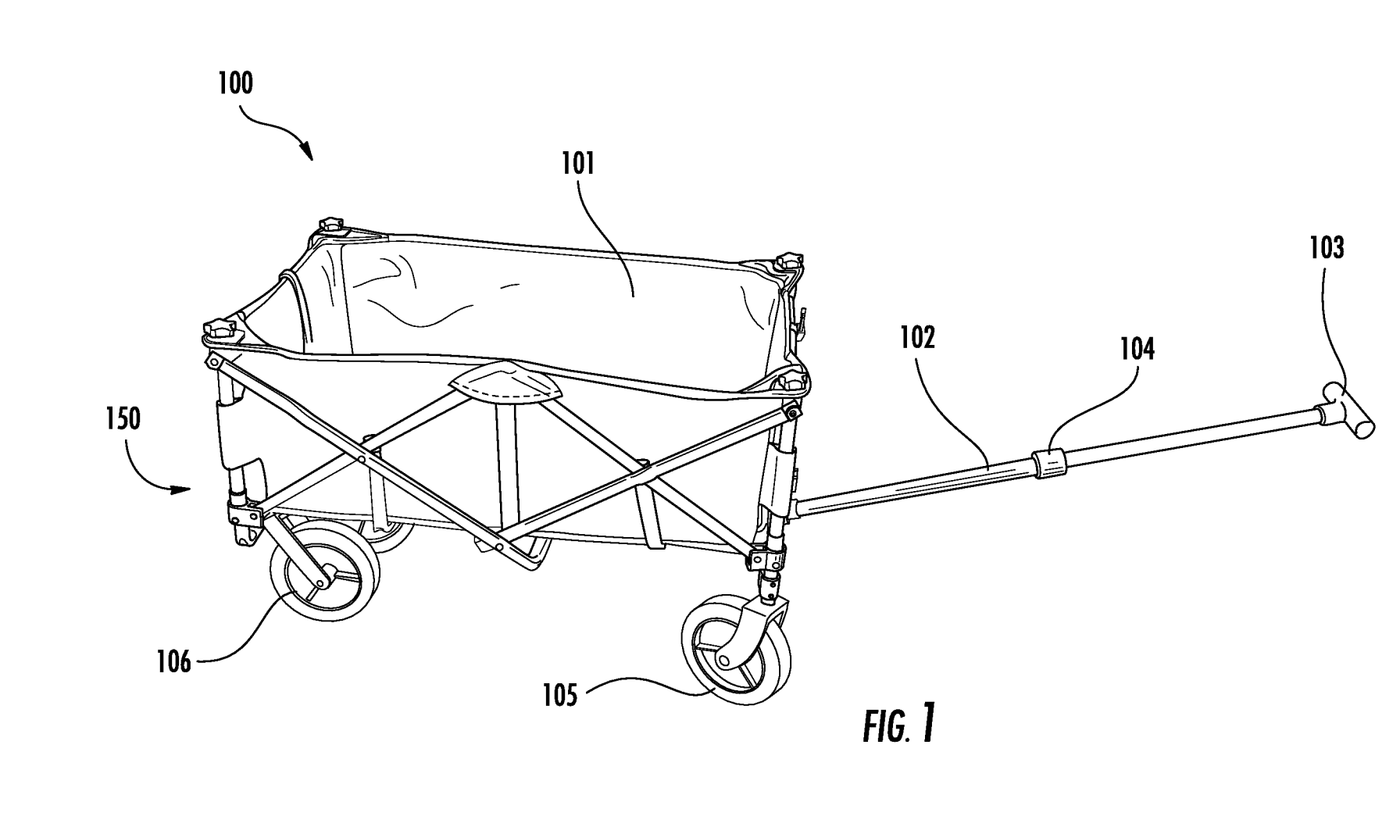
FIG. 1 is a perspective view of a mobile cart.
Figure 8:
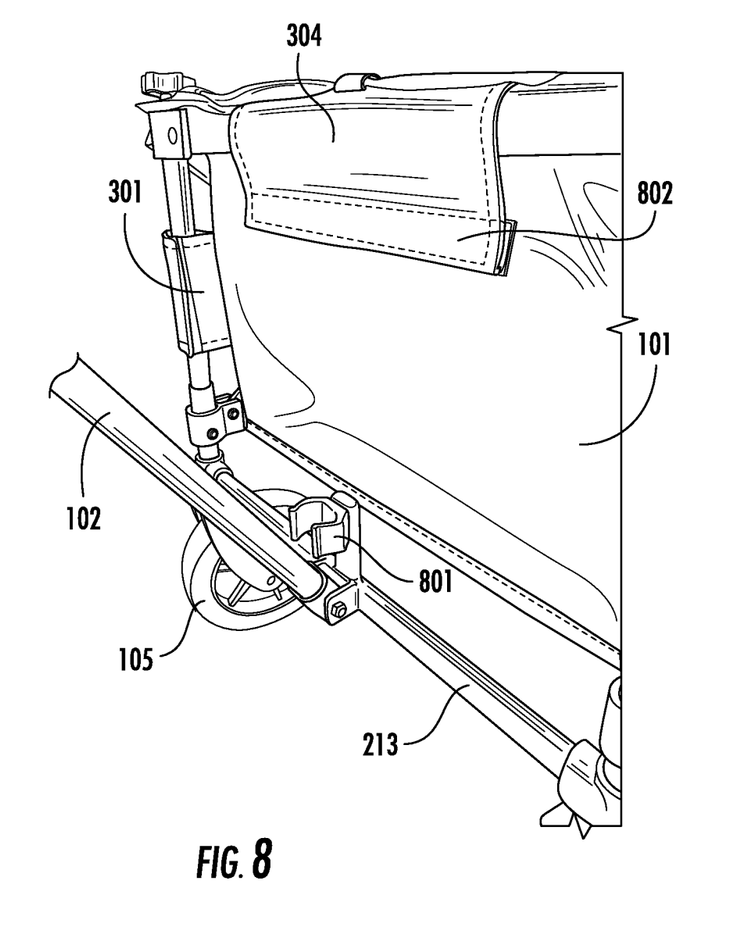
FIG. 8 is a detail perspective view of the mobile cart of FIG. 1.

FIGS. 1-8 illustrate embodiments of a mobile cart 100. In these embodiments, the mobile cart 100 comprises a liner 101, an arm 102, a handle 103, a liner assembly 150, a framework assembly 200, one or more front wheels 105, and one or more rear wheels 106. The arm 102 includes a first end attached to the framework assembly 200 and a second end attached to the handle 103. The arm 102 may be fixed or extendable (i.e., folding, telescoping, or any other mechanism). For example, as shown in FIG. 1, the arm 102 may include a fitting 104 for controlling the extension mechanism. As shown in FIG. 8, the arm 102 may be temporarily held in a vertical position by retainer 801. In some embodiments, the one or more front wheels 105 can swivel and the one or more rear wheels 106 have a fixed orientation. The cart 100 may be configured to move between an extended configuration (e.g., FIGS. 1-3) and a collapsed configuration (e.g., FIGS. 4 and 5). In some embodiments, the cart 100 may include one or more articulating joints to form a scissors mechanism. Although the illustrated embodiments show a mechanism that extends/collapses in a single direction (the longitudinal direction), the cart 100 may be configured to extend/collapse in multiple directions.

Although the mobile cart 100 illustrated in the figures has a rectangular shape (when viewed from above) forming a box, the mobile cart 100 may be configured with a circular shape (when viewed from above) forming a cylinder. Similarly, in some embodiments, the mobile cart 100 may be configured (when viewed from above) as a triangle, square, pentagon, hexagon, heptagon, octagon, nonagon, decagon, or any other polygon or other desired shapes.

Framework Assembly

Figure 2:
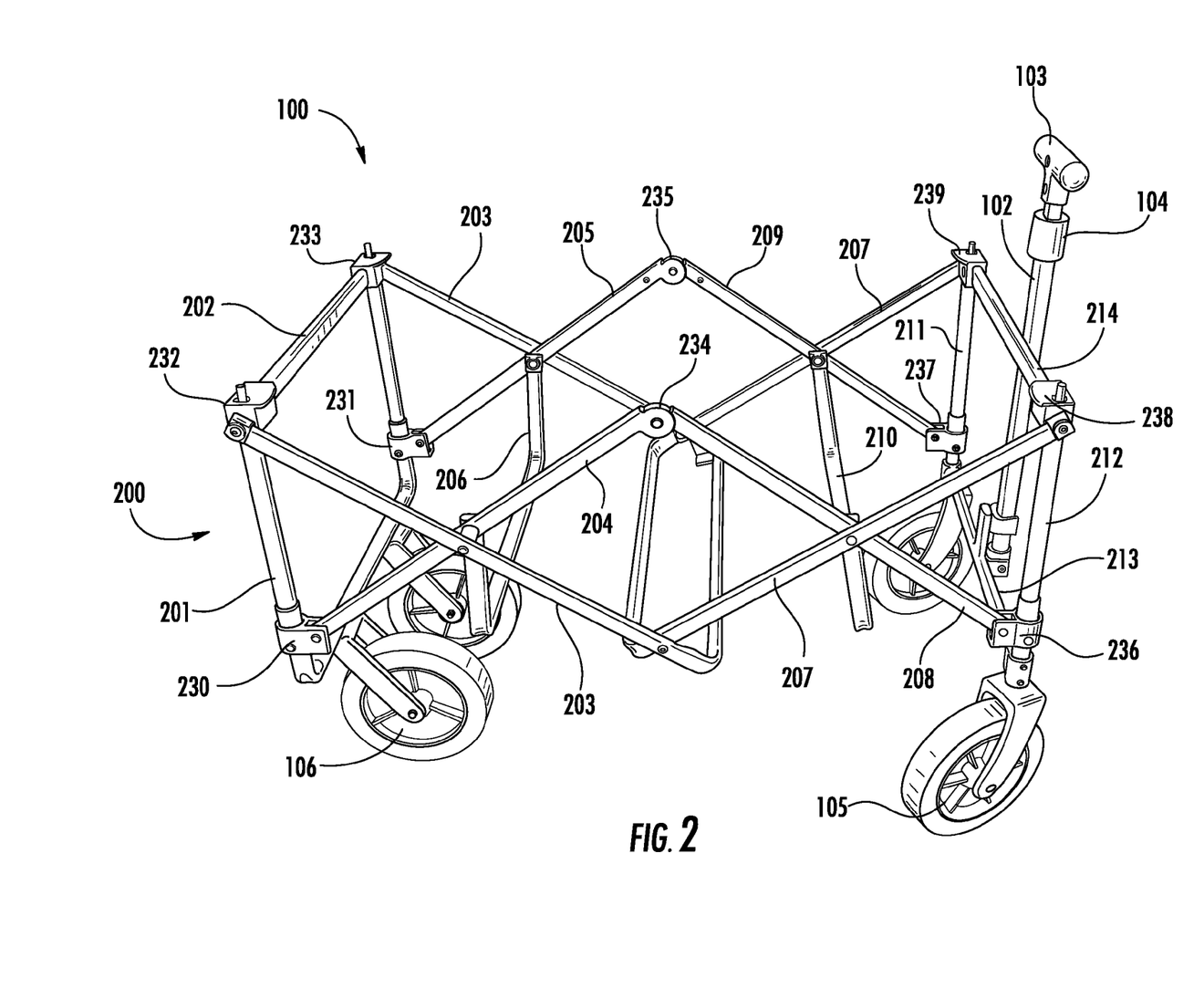
FIG. 2 is a perspective view of the mobile cart of FIG. 1 with the liner removed.
Figure 4:
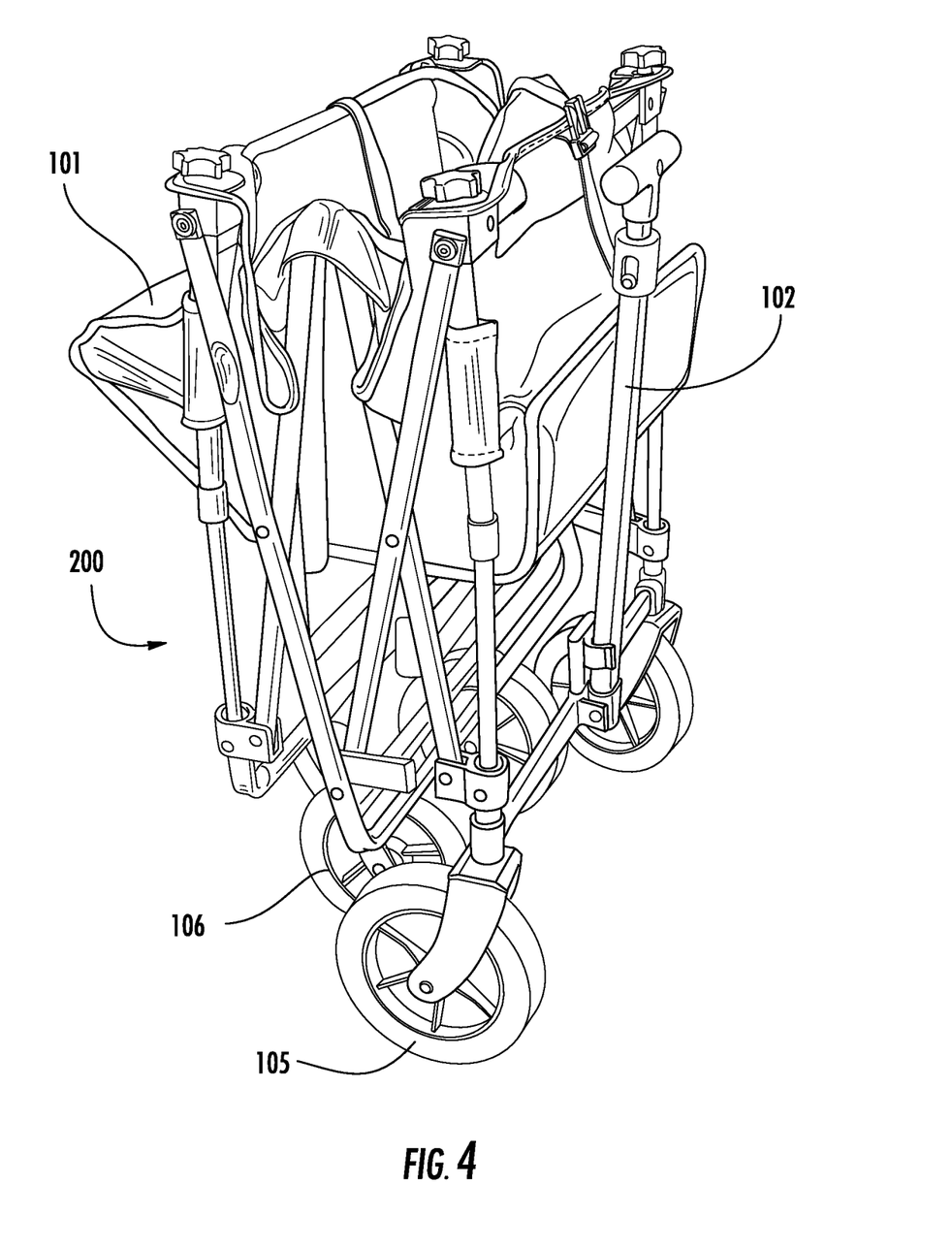
FIG. 4 is a perspective view of the mobile cart of FIG. 1 in a collapsed position.
Figure 5:
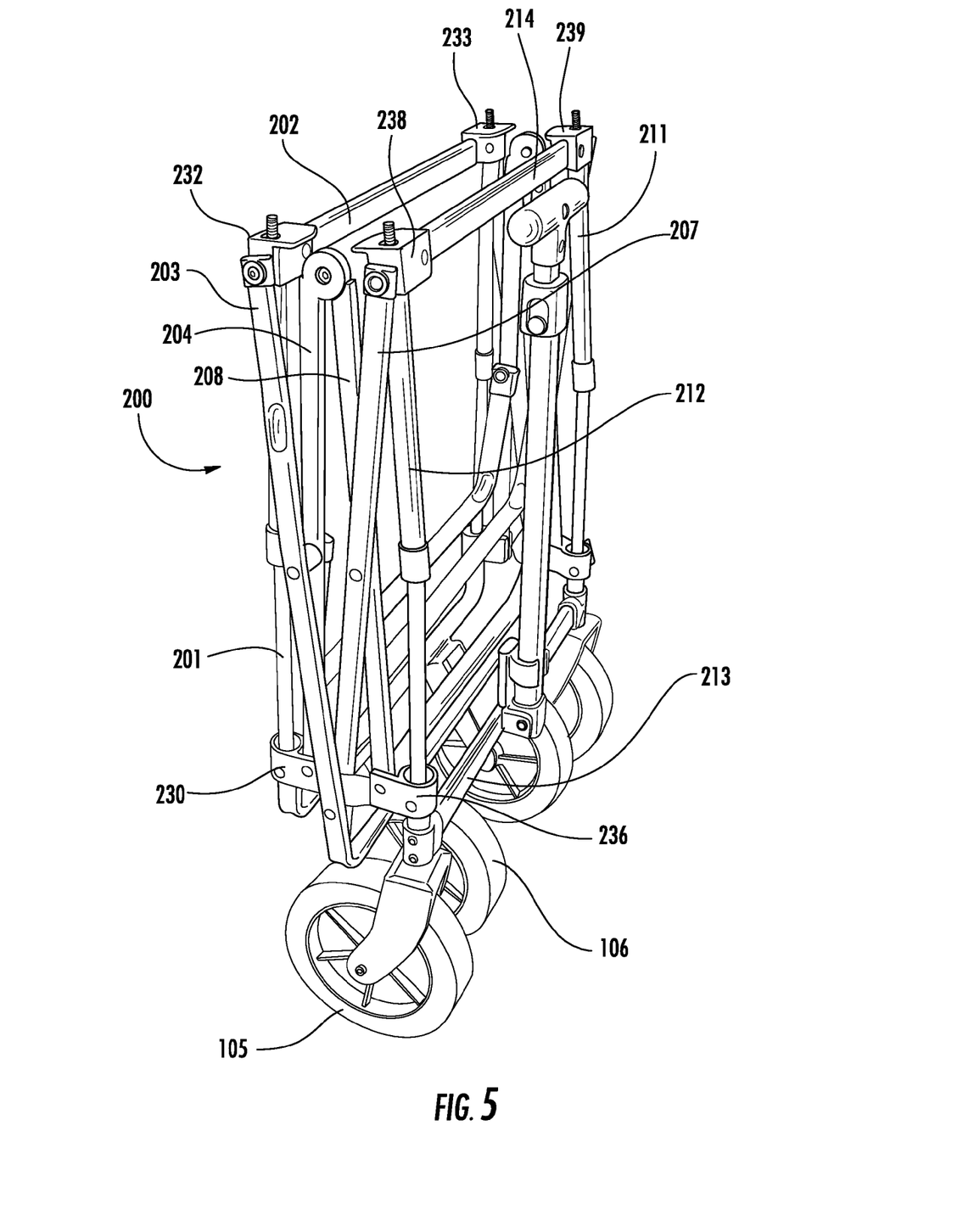
FIG. 5 is perspective view of a mobile cart of FIG. 1 in a collapsed position with the liner removed.

As shown in FIG. 2, the mobile cart 100 may include a framework assembly 200 with a plurality of frame members. The framework assembly 200 may be collapsible and may be configured to move between an extended configuration (FIG. 1) and a collapsed configuration (FIGS. 4 and 5). In some embodiments, the framework assembly 200 includes a rear U-shaped frame member 201 that includes a vertical portion on the right hand side of the cart 100 and a vertical portion on the left hand side of the cart 100. Although the rear U-shaped frame member 201 is illustrated as a single component, in some embodiments, the rear U-shaped frame member 201 may comprise multiple components. For example, the rear U-shaped frame member 201 may include separate vertical components of each side of the mobile cart 100 and a separate horizontal member extending between the vertical components. Spanning between the upper ends of the rear U-shaped frame member 201 is a rear upper frame member 202. The right hand end of the rear upper frame member 202 interfaces with a right rear upper corner 232. Similarly, the left hand end of the rear upper frame member 202 interfaces with a left rear upper corner 233. A lower surface of the right rear upper corner 232 interfaces with the right hand upper portion of the rear U-shaped frame member 201 and a lower surface of the left rear upper corner 233 interfaces with the left hand upper portion of the rear U-shaped frame member 201.

A rear diagonal pivoting U-shaped member 203 includes a right rear interface with the right rear upper corner 232 a left rear interface with the left rear upper corner 233. The rear diagonal pivoting U-shaped member 203 includes side portions on each side of the cart 100 and a connecting portion extending between the side portions. In some embodiments, the rear diagonal U-shaped member 203 is configured with a pivoting interface at both the right rear upper corner 232 and the left rear upper corner 233. As shown in FIG. 2, the interfaces with the right rear upper corner 232 and the left rear upper corner 233 may include pivoting joints configured to pivot about a lateral axis parallel to the rear upper frame member 202. Although the rear diagonal pivoting U-shaped member 203 is illustrated as a single component, in some embodiments, the rear diagonal pivoting U-shaped member 203 may comprise multiple components. For example, the rear diagonal pivoting U-shaped member 203 may include separate components on each side of the mobile cart 100 and a separate horizontal member extending between the side components. Near the lower end of the rear diagonal pivoting U-shaped member 203 and adjacent to the connecting portion there is an interface with a front diagonal pivoting U-shaped member 207.

All of the corners (230-233 and 236-239) may be integral to one or more of their respective adjacent structural members or may be a separate component attached to one or more of their respective adjacent structural members in any number of ways. For example, the corners may be attached by a threaded connection, a slip-fit connection, mechanical fastener(s), chemical fasteners, etc.

On each side of the mobile cart 100, at approximately half of the length of its side portions, the rear diagonal U-shaped member 203 includes an interface with two other components. As shown in FIG. 2 in the extended configuration, the right side portion of the rear diagonal U-shaped member 203, at approximately halfway along its length, interfaces with right rear diagonal member 204 and rear lower support member 206. Similarly, the left side portion of the rear diagonal U-shaped member 203, at approximately halfway along its length, interfaces with left rear diagonal member 205 and rear lower support member 206. In some embodiments, on both the left and right sides, the three components are configured to pivot about a common axis that extends in the lateral direction. The rear lower support member 206 includes a lateral portion that extends between the left and right sides of the cart 100. In some embodiments, the lateral portion of the rear lower support member 206 forms part of a floor on the cart 100 and/or acts to cradle or support the liner 101. As shown in FIG. 2, the rear lower support member 206 is disposed at approximately ¼ of the longitudinal length of the mobile cart 100 in the extended configuration from the rear end of the mobile cart 100.

On the right hand side of the cart 100, the right rear diagonal member 204 extends between right rear lower corner 230 and the right side upper pivot 234. The right rear lower corner 230 is attached to the right hand portion of the rear U-shaped frame member 201 and is directly below the right rear upper corner 232. In some embodiments, the right rear lower corner 230 is configured to slide along the length of the right hand portion of the rear U-shaped frame member 201. At approximately a center along its length, the right rear diagonal member 204 interfaces with the rear diagonal U-shaped member 203 and the rear lower support member 206. A left rear diagonal member 205 has endpoints that interface with the left rear lower corner 231 and the left side upper pivot 235, respectively. At approximately a center along its length, the left rear diagonal member 205 interfaces with the rear diagonal U-shaped member 203 and the rear lower support member 206.

In some embodiments, the right hand portion of the rear U-shaped frame member 201 may be configured to extend in the vertical direction. As one example, the right hand portion of the rear U-shaped frame member 201 may telescope as shown in FIG. 5 in the collapsed configuration (the left hand portion may include similar functionality). In other words, the framework assembly 200 may be configured such that each side portion of the rear U-shaped frame member 201 extend such that right rear upper corner 232 moves away from right rear lower corner 230 and that left rear upper corner 233 moves away from left rear lower corner 231.

The front half of the framework assembly 200 is similar to the rear half. For example, front diagonal pivoting U-shaped member 207 function similar to rear diagonal pivoting U-shaped member 203. In addition, right front diagonal member 208 and left front diagonal member 209 function similar to left rear diagonal member 205 and left rear diagonal member 205, respectively.

Similar to the rear half of the framework assembly 200, a front lower support member 210 interfaces (on the right hand side) at the midpoint of the right side portion of the front diagonal pivoting U-shaped member 207 and the midpoint of right front diagonal member 208. The left side of front lower support member 210 interfaces at the midpoint of the left side portion of the front diagonal pivoting U-shaped member 207 and the midpoint of left front diagonal member 209. As shown in FIG. 2, the front lower support member 210 is disposed at approximately ¼ of the longitudinal length of the mobile cart 100 in the extended configuration from the front end of the mobile cart 100.

On the right hand side of the cart 100, the right front diagonal member 208 extends between right front lower corner 236 and the right side upper pivot 234. The right front lower corner 236 is attached to the right vertical member 212 and is directly below the right front upper corner 238. On the left hand side of the cart 100, the left front diagonal member 209 extends between left front lower corner 237 and the left side upper pivot 235. The left front lower corner 237 is attached to the left vertical member 211 and is directly below the left front upper corner 239.

The primary difference between the front half and the rear half of the framework assembly 200 is the structure of the vertical members 211 and 212 and the associated cross members. As discussed above, the rear U-shaped frame member 201 may be configured as multiple components but is illustrated as a single component. At the front end of the framework assembly 200, there is a left vertical member 211 and a right vertical member 212 along with a lower cross member 213 and an upper cross member 214. The arm 102 and retainer 801 may be attached to lower cross member 213.

In some embodiments, the left and right vertical members 211 and 212 may be configured to extend in the vertical direction. As one example, the left and right vertical members 211 and 212 may telescope as shown in FIG. 5. In other words, the framework assembly 200 may be configured such that the left and right vertical members 211 and 212 extend such that the right and left front upper corners 238 and 239 move away from the right and left front lower corners 236 and 237, respectively.

The differences between the front and rear portions of the framework assembly 200 also facilitates differences between the one or more front wheels 105 and the one or more rear wheels 106 (e.g., the lateral location of the wheels). In some embodiments, the one or more rear wheels 106 are disposed toward the center (i.e., spaced away from the extreme left and/or right sides of the mobile cart 100). For example, the rear U-shaped frame member 201 may include lower corners with radii such that the one or more rear wheels 106 are mounted inboard (toward the center) from the radii. In contrast to the rear wheels 106, in some embodiments, the one or more front wheels 105 are mounted at the lower end of one or both of the vertical members 211 and 212. As shown in FIG. 5, the varying locations of the one or more front wheels 105 and the one or more rear wheels 106 allow the one or more front wheels 105 and the one or more rear wheels 106 to arranged approximately side-by-side in the collapsed configuration. Although the rear wheels are illustrated in the inboard position (with the single-piece radiused rear frame), in some embodiments, the front wheels are mounted inboard of the rear wheels and the front portion of the framework assembly 200 may include a single-piece radiused frame. In addition, in some embodiments, all wheels may be located at the same lateral location (i.e., the front and rear wheels may be equally spaced from the sides of the cart).

Liner Assembly

Figure 3:
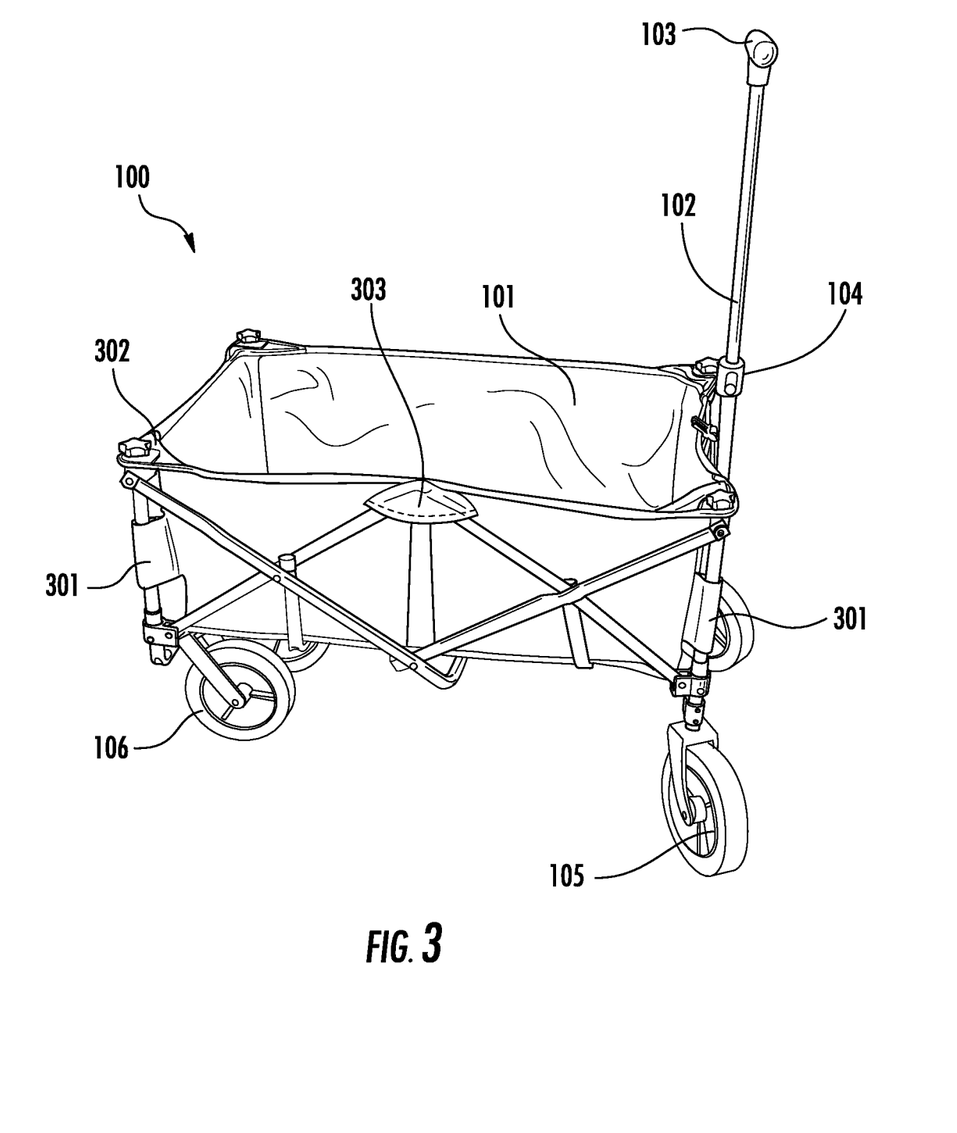
FIG. 3 is another perspective view of the mobile cart of FIG. 1.

The liner assembly 150 may be attached to the framework assembly 200 in multiple places. For example, as shown in FIGS. 3 and 8, the liner 101 may include one or more corner vertical sleeve attachment portions 301, one or more upper corner attachment portions 302, one or more upper pocket attachment portions 303, and one or more horizontal sleeve attachment portions 304.

The liner 101 may be constructed using a flexible fabric or flexible plastic material and may include a collapsible floor and a plurality of collapsible vertical sides. As shown in FIG. 3, in some embodiments, the liner 101 includes a floor, four vertical sides, and an upper peripheral edge. The liner 101 may include a single vertical side, two vertical sides, three vertical sides, or may include more than four vertical sides. The liner 101 may include some rigid portions or panels; however, the liner 101 substantially conforms to the approximate shape of the framework assembly 200. In other words, the liner 101 provides sufficient support to hold objects in the cart and moves with the framework assembly 200 between the extended configuration (FIGS. 1 and 3) and the collapsed configuration (FIG. 4).

To secure the liner 101 to the framework assembly 200, the liner 101 may include at least one retaining member. For example, the liner 101 may include a retaining member at one or more of the upper corners (i.e., 232, 233, 238, 239), at one or more of the vertical corner members or vertical corner posts (i.e., the left and right hand portions of the rear U-shaped frame member 201, left and right vertical members 211 and 212), and at one or more of the end bars (i.e., rear upper frame member 202 and upper cross member 214).

Figures 6A, 6B:
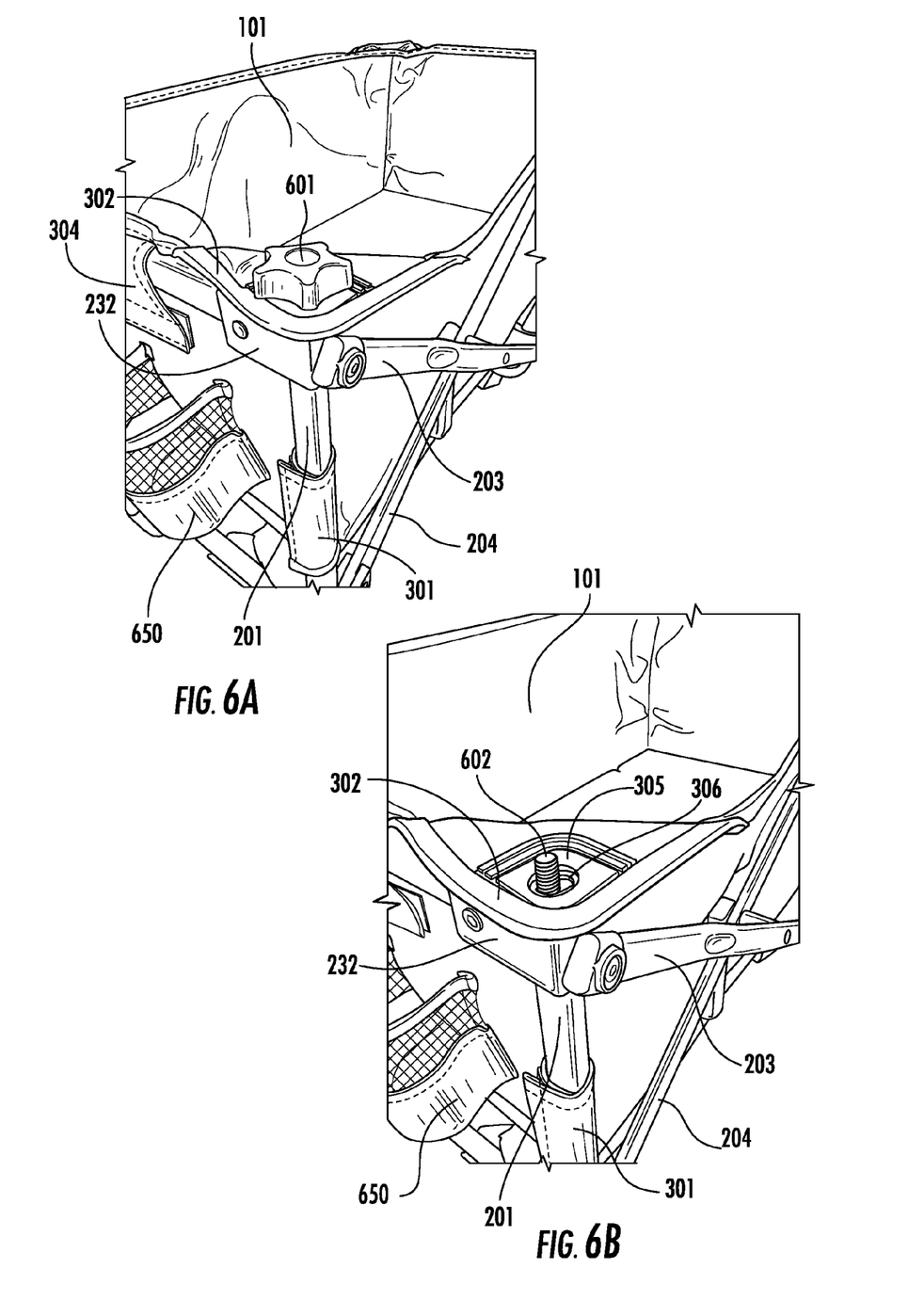
FIGS. 6A and 6B are detail perspective views of the mobile cart of FIG. 1.
Figure 6C:
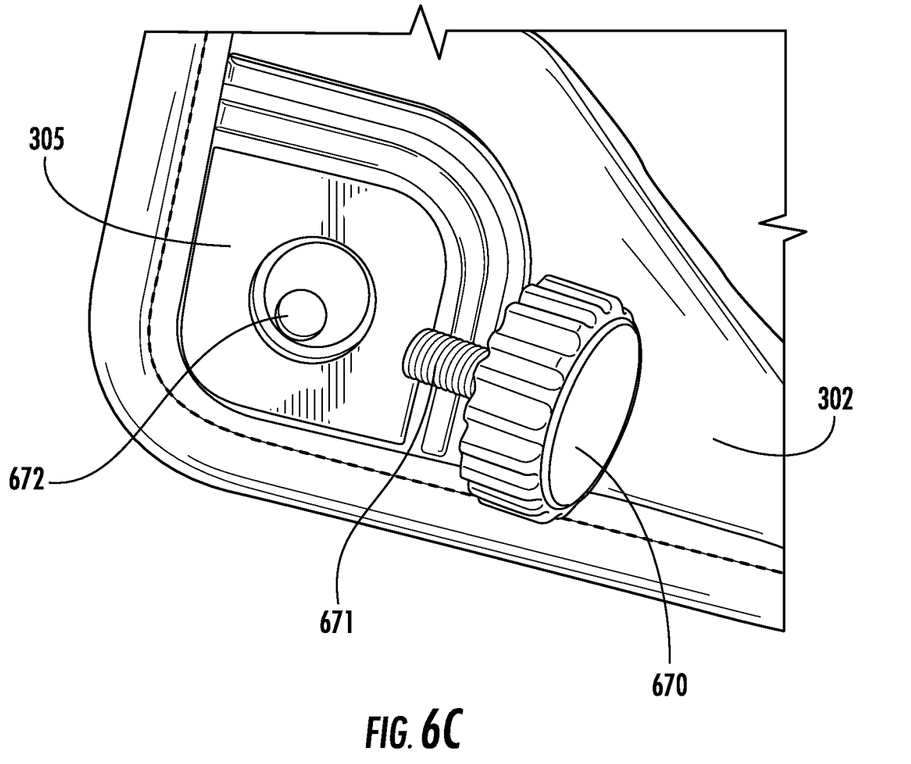
FIG. 6C is detail top view of an alternate embodiment of a mobile cart.
Figure 7:
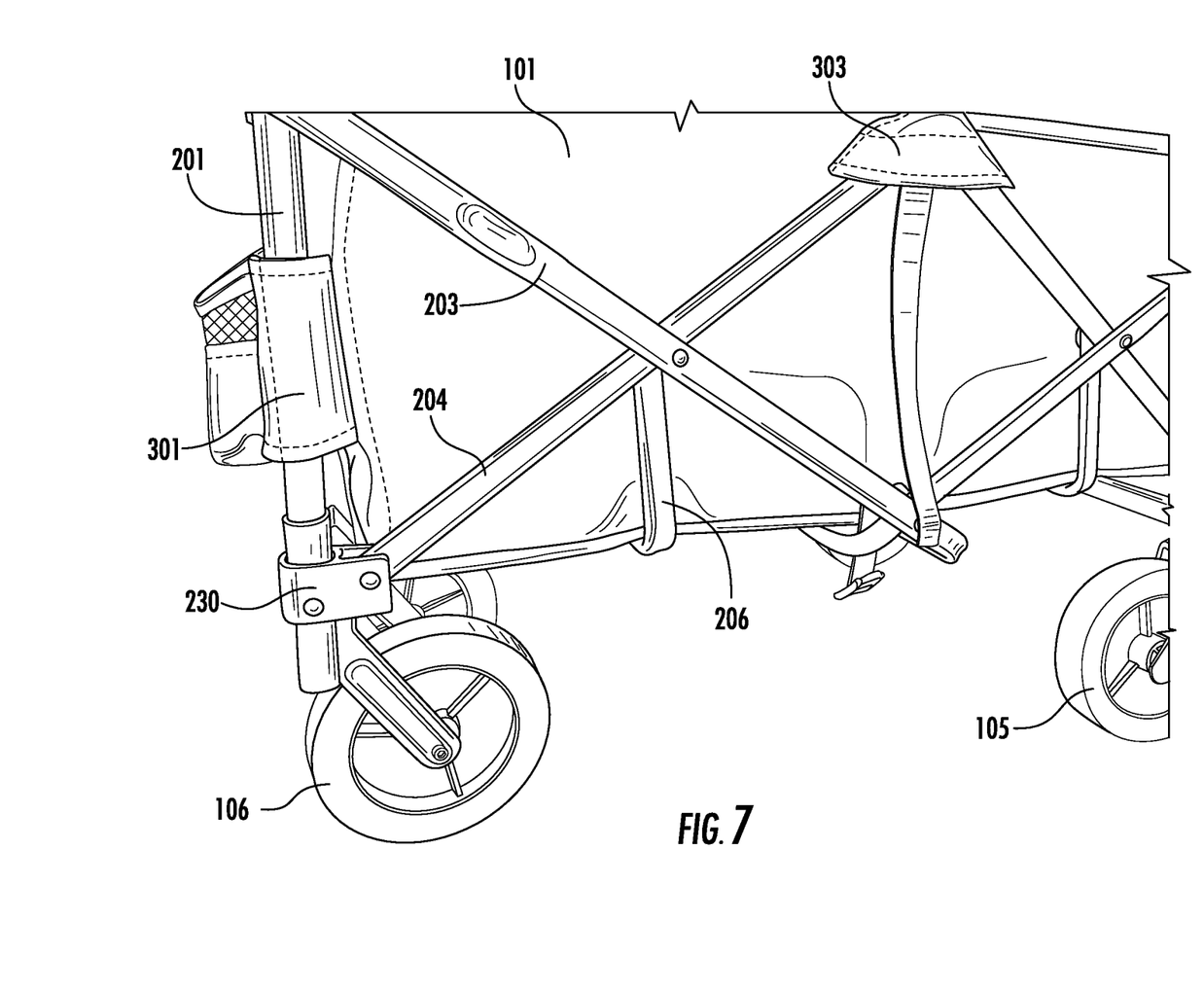
FIG. 7 is a detail perspective view of the mobile cart of FIG. 1.

As shown in FIGS. 6A-6C, the one or more upper corner attachment portions 302 may function as at least one retaining member or removable connector between the liner 101 and the framework assembly 200. Each of the at least one upper corner attachment portions 302 may include a flange portion 305 and a hole 306. The flange portion 305, which may be located on or adjacent to the upper peripheral edge, may include reinforcement or a rigid internal member or may be constructed from the same material as the floor and the vertical sides of the liner 101. In some embodiments, each upper corner attachment portion 302 may be secured to the framework assembly 200 using an anchor device. One example of securing upper corner attachment portion 302 is shown in FIG. 6C where the anchor device is a fastener 670, which includes a protrusion affixed to the underside of the fastener 670, where the protrusion (illustrated as a threaded rod 671) is configured to pass through hole 306 and to be inserted into a hole 672 in the upper corner (i.e., 232, 233, 238, 239). In some embodiments, the hole 672 may be a tapped hole. Although the protrusion is illustrated as a threaded rod 671, the protrusion may be a smooth shaft or other mechanical fastener configured to engage in a different manner (i.e., cotter pin or magnet).

In some embodiments, as shown in FIGS. 6A and 6B, each upper corner (i.e., 232, 233, 238, 239) may include a protrusion (e.g., rod 602) extending upward. In some embodiments, the rod 602 may be threaded. The one or more upper corner attachment portions 302 may be disposed such that the rod 602 extends through hole 306 (as shown in FIG. 6B). To interface with this protrusion, the anchor device may be a nut 601 that includes a tapped hole on its underside may be threaded onto the rod 602 (as shown in FIG. 6A). The nut 601 may be attached in a different manner to rod 602 (i.e., clamped, pinned, adhesive, etc.).

In addition to or in lieu of the one or more upper corner attachment portions 302, the liner 101 may include additional retaining members. For example, the liner 101 may include one or more corner vertical sleeve attachment portions 301 that are configured to loop around one of the corner vertical portions (i.e., the left and right hand portions of the rear U-shaped frame member 201, the left and right vertical members 211 and 212). Similarly, the liner 101 may include one or more horizontal sleeve attachment portions 304 that are configured to loop around one of the horizontal portions (i.e., rear upper frame member 202 and upper cross member 214). As shown in FIG. 8, the sleeve attachment portions (301 and 304) may include a fastening portion 802. In some embodiments, the fastening portion 802 may be removable or replaceable and may include, for example, hook and loop fastening and/or magnets.

To secure the longitudinal upper edges of the liner 101, the cart 100 may include one or more upper pocket attachment portions 303. The one or more upper pocket attachment portions 303 may be configured to enclose (from above) right side upper pivot 234 and left side upper pivot 235.

Additionally, to secure the liner 101, the framework assembly 200 may include multiple components configured to cradle the underside of the liner 101. For example, the framework assembly 200 may be configured such that, in the extended configuration, the horizontal portion of the rear diagonal U-shaped member 203 and/or the horizontal portion of the front diagonal pivoting U-shaped member 207 support the lower surface of the liner 101. In addition, the rear lower support member 206 and the front lower support member 210 may also support the lower surface of the liner 101.

On the forward facing surface or the rear facing surface of the liner (or on both forward and rear facing surfaces), the liner 101 may include one or more cup holders 650.

The components of the mobile cart 100 may be formed of materials including, but not limited to, cotton, wool, canvas, polyester, carbon composite, plastic, thermoplastic, steel, aluminum, stainless steel, other plastic or polymer materials, other metallic materials, other composite materials, or other similar materials. Moreover, the components of the mobile cart 100 may be attached to one another via suitable fasteners, which include, but are not limited to, screws, bolts, rivets or other mechanical or chemical fasteners.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A mobile cart, comprising:
   a framework assembly comprising an extended configuration and a collapsed configuration, the framework assembly comprising at least three corners;
   at least two wheels attached to the framework assembly; and
   a removable liner secured to the framework assembly in a removable fashion, the removable liner comprising:
      a collapsible floor; and
      at least two collapsible sides extending vertically from the collapsible floor; and
   at least three retaining members configured to engage the framework assembly proximate the at least three corners such that each retaining member is movable between an engaged configuration and a disengaged configuration, wherein each retaining member is configured such that the removable liner can be selectively removed from the framework assembly when the at least three retaining members are in the disengaged configuration and retained on the framework assembly when the at least three retaining members are in the engaged configuration, wherein:
   when in the disengaged configuration, the at least three retaining members are disconnected from the framework assembly, and, when in the engaged configuration, the at least three retaining members are attached to the framework assembly;
   the removable liner further comprises at least three corner flanges, each of the at least three corner flanges comprising a hole configured to be retained on a protrusion when the at least three retaining members are attached to the framework assembly; and
   the protrusion is a portion of one of the at least three retaining members, the protrusion configured to releasably engage the framework assembly proximate the at least three corners of the framework assembly.

2. The mobile cart of claim 1, wherein the framework assembly comprises a scissors mechanism that collapses and extends in at least one direction.

3. The mobile cart of claim 1, wherein the removable liner comprises a flexible fabric or flexible plastic material.

4. The mobile cart of claim 1, wherein the at least three corner flanges comprise reinforcement members.

5. The mobile cart of claim 1, wherein the at least one retaining member comprises at least one attachment sleeve extending from the removable liner.

6. The mobile cart of claim 5, wherein the at least one attachment sleeve is configurable between an open configuration in which the at least one attachment sleeve includes a free end not secured to the removable liner and a closed configuration in which the free end is releasably secured to the removable liner.

7. The mobile cart of claim 6, wherein the at least one attachment sleeve comprises at least one horizontal sleeve configured to wrap around a horizontal framework member of the framework assembly and at least one vertical sleeve configured to wrap around a vertical framework member of the framework assembly.

8. The mobile cart of claim 1, wherein the at least two wheels comprise a first pair of wheels and a second pair of wheels wherein one of the pairs of wheels is spaced closer together than the other pair of wheels.

9. The mobile cart of claim 1, wherein the framework assembly comprises two lower support members where each lower support member comprises a lateral portion that extends between a left side and a right side of the mobile cart such that the lateral portion supports the collapsible floor of the removable liner.

10. A mobile cart, comprising:
    a framework assembly configured to move between an expanded configuration and a collapsed configuration;
    a removable liner secured to the framework assembly in a removable fashion, the removable liner configured to be flexible, the removable liner comprising:
       a collapsible floor;
       at least one collapsible side extending vertically from the collapsible floor; and
       an upper peripheral edge at the top of the at least one collapsible side;
    a plurality of retaining members movable between an engaged configuration and a disengaged configuration, wherein the plurality of retaining members are configured such that the removable liner can be selectively removed from the framework assembly when the plurality of retaining members are in the disengaged configuration and retained on the framework assembly when the plurality of retaining members are in the engaged configuration, wherein at least one of the plurality of retaining members is configured to engage the framework assembly proximate the upper peripheral edge, wherein:
    the removable liner further comprises at least three flanges, each of the at least three flanges comprising a hole configured to be retained on a protrusion when the plurality of retaining members are attached to the framework assembly; and
    the at least three flanges comprise reinforcement members; and
    the protrusion is a portion of one of the plurality of retaining members, the protrusion configured to releasably engage the framework assembly proximate the upper peripheral edge.

11. The mobile cart of claim 10, wherein, when in the disengaged configuration, the plurality of retaining members are disconnected from the framework assembly, and, when in the engaged configuration, the plurality of retaining members are attached to the framework assembly.

12. A mobile cart, comprising:
    a framework assembly comprising an extended configuration and a collapsed configuration, the framework assembly comprising at least three corners;
    at least two wheels attached to the framework assembly; and a removable liner secured to the framework assembly in a removable fashion, the removable liner comprising:
   a collapsible floor; and
   at least two collapsible sides extending vertically from the collapsible floor;
at least one retaining member comprising at least one attachment sleeve extending from the removable liner wherein the at least one retaining member is movable between an engaged configuration and a disengaged configuration, wherein the at least one retaining member is configured such that the removable liner can be selectively removed from the framework assembly when the at least one retaining member is in the disengaged configuration and retained on the framework assembly when the at least one retaining member is in the engaged configuration, wherein:
the at least one attachment sleeve is configurable between an open configuration in which the at least one attachment sleeve includes a free end not secured to the removable liner and a closed configuration in which the free end is releasably secured to the removable liner; and
the at least one attachment sleeve comprises at least one horizontal sleeve configured to wrap around a horizontal framework member of the framework assembly and at least one vertical sleeve configured to wrap around a vertical framework member of the framework assembly.

13. The mobile cart of claim 12, wherein the at least one retaining member further comprises a nut that engages a protrusion extending from the framework assembly.

14. The mobile cart of claim 12, wherein the at least one retaining member further comprises a fastener comprising a protrusion that engages a hole in the framework assembly.

* * * * *